Patented July 28, 1953

2,647,119

UNITED STATES PATENT OFFICE 2,647,119

PURIFICATION OF MELAMINE

John Wynne Haworth and Morris George Cooper, London, England, assignors to The British Oxygen Company Limited, London, England, a British company No Drawing. Application November 2, 1949, Serial No. 125,154. In Great Britain November 10, 1948

1 Claim. (Cl. 260—249.7)

The present invention relates to the production of melamine.

It is known that melamine can be prepared from a variety of chemical compounds. The compound most generally employed commercially at the present time is dicyandiamide from which melamine is produced by heating, usually in the presence of ammonia under pressure. Other compounds which can be used are, for example, cyanamide, urea, ammeline, ammelide and cyanuric acid.

Melamine when prepared from such materials contains a proportion of contaminants of low solubility in water but known to be more readily soluble in caustic alkalies. The presence of such contaminants, in particular ammeline-type impurities, by which term is meant any substance or mixture of substances having a triazine nucleus in which at least one —OH group is present, render melamine commercially unacceptable if present in any appreciable amount. For example, crude melamine manufactured from dicyandiamide may contain up to 10% ammeline and it has been proposed to prepare purified melamine therefrom by dissolving the crude melamine in boiling water and then cooling to precipitate crystalline melamine, some caustic soda lye being added during cooling to prevent separation of any ammeline which may be present.

It is an object of this invention to provide an improved process for preparing from melamine containing ammeline-type impurities a substantially pure recrystallised melamine with virtually no loss of melamine.

As above mentioned the ammeline-type impurities are known to be soluble in alkaline materials and such impurities will hereinafter be referred to as caustic soluble materials.

According to this invention there is provided a method of preparing from crude melamine containing caustic soluble materials a purified melamine having a reduced content of caustic soluble impurities which comprises mixing the crude melamine at an elevated temperature with an aqueous liquor containing melamine in solution, filtering undissolved materials therefrom, adding to the filtered solution an alkali metal hydroxide or an alkaline earth metal hydroxide and cooling to recrystallise melamine from the solution, the amount of hydroxide added being sufficient to retain in solution at the recrystallisation temperature those caustic soluble materials not removed during the filtration operation but not in excess of that amount which will raise the pH value to 13.

The reduction in the content of caustic soluble impurities which is achieved by proceeding in accordance with the invention is such that a commercially acceptable grade of melamine is produced.

For dissolving the crude melamine it is preferred to use as the aqueous liquor a solution of melamine which is saturated with melamine at the recrystallisation temperature. It may be advantageous to use an aqueous solution of melamine which also contains salts of alkali or alkaline earth metals, in concentrations of up to about 5%. Such salts reduce the solubility differential of melamine between hot and cold water, but not to any significant extent. Initially, a solution may be used which is not saturated in melamine but this will result in a smaller amount of melamine being recovered by recrystallisation from the initial liquor which will, however, become a saturated or supersaturated solution of melamine and, when re-used as solvent for a further amount of crude melamine, will permit of substantially quantitative yields of melamine being obtained on recrystallisation.

The operation of dissolving the melamine can be carried out batchwise or in a continuous manner. In the batch process the dissolving liquor and the crude melamine, preferably finely ground, are charged to a vessel, heated with stirring and maintained at an elevated temperature until solution of the crude melamine is substantially complete. Continuous solution may be affected by any of the standard methods such as, for example, by passing the crude melamine and the dissolving solution through a long pipe, through a long trough fitted with stirring means, through a multi-compartment tank, or through a series of vessels in cascade. Both in batch and continuous processes, good agitation is essential. In continuous processes end to end mixing must of course be avoided or minimised. During the solution operation or prior to filtration a decolourising agent such as activated carbon and a filter aid such as kieselguhr may be added to the solution. On completion of solution, however effected, the solution is filtered from insoluble impurities and from any decolourising agent or filter aid, and the solution treated with alkali in accordance with the invention.

It is necessary to prevent the pH value of the melamine solution from reaching 13 when treating with alkali since the rate of hydrolysis of melamine increases rapidly with increasing pH value of the solution. By way of example, the following table shows the extent of hydrolysis of a 3% solution of melamine at 100° C. in two hours in the presence of sufficient alkali to give the following pH values:

| pH | Percent hydrolysis of melamine |
|---|---|
| 12 | 0.34 |
| 13 | 3.2 |
| 14 | 36.9 |

If the amount of hydroxide added is insufficient there is risk of caustic soluble materials coming out of solution with the melamine on recrystallisation. On the other hand, if the amount of hydroxide added is such that the pH value of the solution reaches 13, there is risk of appreciable hydrolysis of the melamine as shown in the above table.

The amount of melamine which is lost by hydrolysis during recrystallisation is kept to a minimum by adding the hydroxide to the melamine solution only after filtration and immediately before the solution is cooled to precipitate the melamine, so that the amount required is only that equivalent to the solubility of the caustic soluble impurities in hot water and not to the total amount of such impurities originally present in the crude melamine, such reduced amount being then insufficient to raise the pH to 13; further the period during which the melamine is subjected to the hydrolysing action of the hydroxide solution is then as short as possible.

In order to prevent the accumulation of hydroxide in the mother liquor during a continuous process in which the mother liquor from the recrystallisation of one batch of crude melamine is used as the aqueous liquor for dissolving a further batch of crude melamine, the mother liquor from the recrystallisation may be treated before re-use with an acid equivalent in amount to the hydroxide added and then used as the aqueous liquor for mixing with crude melamine. For this purpose any acid may be used which does not form an insoluble salt with melamine, or decompose any of the melamine, under the conditions of operation. Examples of suitable acids for this purpose are hydrochloric acid, sulphuric acid, and acetic acid. The addition of the acid will result in the precipitation of the caustic soluble materials which were retained in solution during the recrystallisation of the melamine. The suspension can be filtered if desired but this would be an unnecessary elaboration because any suspended matter will be removed in the course of the subsequent filtration which is carried out before the addition of the hydroxide.

In cases where the crude melamine is produced in a closed vessel under conditions of relatively high temperature and pressure, it may be convenient to form a slurry by injecting water into the vessel (the amount of water being insufficient to dissolve more than a fraction of the melamine) and then transferring the slurry which will usually be at a temperature above 100° C. to an aqueous liquor containing melamine at a temperature below 100° C. wherein the melamine is dissolved and the subsequent steps performed in accordance with the invention to recrystallise a pure melamine.

The following examples illustrate the preparation of a commercially acceptable grade of melamine from a crude melamine product in accordance with the invention.

Example 1

100 parts of crude melamine containing 10 parts of material soluble in aqueous caustic alkali and an additional 8 parts of materials insoluble in either water or aqueous alkali were stirred with 3000 parts of an aqueous solution of melamine which was saturated at room temperature. The mixture was heated for 20 minutes at a temperature of 95–100° C. after addition of 2 parts of decolourising charcoal and then filtered. To the clear hot filtrate was then added 1.5 parts of sodium hydroxide, thus raising the pH to between 11.5 and 12, and the solution cooled to room temperature. Pure melamine separated as a white crystalline solid which was filtered on a vacuum filter and washed with 200 parts of water. 70 parts of the purified product were obtained containing less than 0.1% of caustic soluble material, and which gave a clear solution when 1 part was dissolved in 500 parts of water at room temperature.

Example 2

To the mother liquor remaining after the purified melamine had been filtered as in Example 1, was added 4 parts of concentrated hydrochloric acid, and the resulting turbid solution which has pH of 7.5–8, was used as the solvent for recrystallising a further 100 parts of the crude melamine. 80 parts of purified melamine were obtained, equal in quality to that produced in Example 1.

Example 3

100 parts of crude melamine containing 3 parts of material soluble in aqueous caustic alkali and an additional 4 parts of material insoluble in either water or caustic alkali were stirred with 3000 parts of an aqueous solution of melamine which was saturated at room temperature. The mixture was heated for 30 minutes at a temperature of 95–100° C. after addition of 2 parts of decolourising charcoal and then filtered. To the clear hot filtrate was then added 6.3 parts $Ba(OH)_2.8H_2O$, and the solution cooled to room temperature. Pure melamine separated as a white crystalline solid, which was filtered on a vacuum filter and washed with 100 parts of water. 90 parts of purified product were obtained.

We claim:

A process for the preparation of a commercially acceptable purified melamine from crude melamine containing caustic soluble impurities which comprises mixing the crude melamine at an elevated temperature with an aqueous liquor containing melamine in solution, filtering undissolved materials therefrom, adding to the filtered solution a hydroxide selected from the group consisting of alkali metal hydroxides and alkaline earth metal hydroxides, cooling to recrystallize melamine from the solution, the amount of hydroxide added being such as to ensure that the pH value of the solution at the recrystallization temperature lies between about 11.5 and 13 but below the latter, separating the recrystallized melamine from aqueous liquor constituting mother liquor, treating the said mother liquor with an acid which does not dissolve melamine or form an insoluble salt therewith under the conditions of operation, the acid being equivalent in amount to the amount of hydroxide previously added, and subsequently using the acid-treated mother liquor as the aqueous liquor for dissolving a further amount of crude melamine in the first operation hereof.

JOHN WYNNE HAWORTH.
MORRIS GEORGE COOPER.

References Cited in the file of this patent

UNITED STATES PATENTS

| Number | Name | Date |
| --- | --- | --- |
| 2,191,361 | Widmer | Feb. 20, 1940 |
| 2,288,964 | Widmer | July 7, 1942 |
| 2,341,180 | Jayne | Feb. 8, 1944 |
| 2,396,193 | Paden | Mar. 5, 1946 |